United States Patent [19]

Weinlich

[11] Patent Number: 4,574,238

[45] Date of Patent: Mar. 4, 1986

[54] PROJECTILE SPEED MEASURING APPARATUS

[76] Inventor: Leopold Weinlich, Industriestrasse 6, D-6831 Reilingen, Fed. Rep. of Germany

[21] Appl. No.: 609,450

[22] Filed: May 11, 1984

[30] Foreign Application Priority Data

May 20, 1983 [DE] Fed. Rep. of Germany ....... 3318378

[51] Int. Cl.$^4$ .......................... G01P 3/66; G01P 3/80
[52] U.S. Cl. .................................. 324/178; 250/222.1
[58] Field of Search ............... 324/178, 175, 174, 173; 250/222.1, 214 RC

[56] References Cited

U.S. PATENT DOCUMENTS

| | | | |
|---|---|---|---|
| 3,811,091 | 5/1974 | Ha et al. ..................... | 324/175 X |
| 4,128,761 | 12/1978 | Oehler ........................... | 324/178 |

FOREIGN PATENT DOCUMENTS

| | | | |
|---|---|---|---|
| 0130168 | 10/1979 | Japan ............................. | 324/178 |
| 533976 | 11/1976 | U.S.S.R. ........................ | 324/175 |

Primary Examiner—Stanley T. Krawczewicz
Attorney, Agent, or Firm—Frishauf, Holtz, Goodman & Woodward

[57] ABSTRACT

An apparatus for measuring the speed of a projectile fired from a handgun or small arm has a measuring path, over which the projectile passes, with light gates disposed spaced apart from one another. Each light gate has a light responsive element, which is shielded from the projectile path by a screen containing a light admitting aperture. An electronic signal evaluation circuit processes the signals emitted by the two light responsive elements in accordance with the darkening of the apertures caused by the projectile in flight above them and supplies these signals to a display device. In order to reduce to a minimum the danger of damage to the apparatus or of harm to persons, caused either by the projectile itself or by parts broken off the apparatus by the projectile without providing a connection between the barrel of the gun and the measuring apparatus, the arrangement is selected such that the two light responsive elements are disposed behind a separating wall common to both. The separating wall includes the light admitting apertures and acts as a screen. It is aligned substantially parallel to the projectile path and extends from near the muzzle of the weapon to beyond the second light responsive element, that is, the one disposed most remotely from the muzzle, and this separating wall protects the light responsive elements from the projectile.

29 Claims, 21 Drawing Figures

PROJECTILE SPEED MEASURING APPARATUS

The invention relates to an apparatus for measuring the speed, or muzzle velocity, of a projectile such as a bullet fired from a handgun or other small arm.

BACKGROUND

Bullet or projectile speed measuring apparatus may use a measuring path, traversed in flight by the projectile, which has two light gates disposed at a predetermined distance from one another along it. Each light gate has a light responsive element, which is shielded by a screen or shield having apertures from the projectile path. Such apparatus also includes an electronic signal evaluation circuit, which processes signals emitted in succession by the two light responsive elements in accordance with the darkening caused by the projectile traveling above them and delivers these signals to a display device.

An apparatus of this kind known in practice uses two separate light gates, each of which has a directionally sensitive light responsive element accommodated in its own housing having a light-admitting aperture disposed crosswise to the projectile path. The light responsive elements are illuminated through the apertures, either by daylight or by the light of lamps disposed above them. The brief darkening of the aperture that is caused by the flight of a projectile over it causes the light responsive element to emit a corresponding signal. Time counters of the associated signal evaluation circuit measure the period of time that has elapsed between the appearances of signals from the two light responsive elements, and the projectile speed can be calculated from the length of this period, taken together with the distance between the two light gates.

The two light gates, each with its own housing, are disposed one after the other on a rail-like base plate, with the attendant danger that a light gate, particularly the one located farther from the muzzle of the weapon, may be struck by the projectile. The result is not only the possible destruction of the apparatus; persons may also be endangered by the ricocheting projectile or by brokenoff fragments. Aside from this, the use of a plurality of separate parts is associated with the danger of unreliable measurements, because the distance between the two light gates is part of the calculation of the projectile speed and must accordingly be established very precisely. The projectile speed must be calculated on the basis of the time interval and the distance between light gates in a separate operation.

The danger of mistakenly striking part of the measuring apparatus with the projectile is overcome, in another apparatus known in practice by providing that the apparatus, which again has two light gates spaced apart from one another, be mounted directly upon the barrel of the weapon. In so doing, however, it is unavoidable that the vibrations produced in the barrel when the weapon is fired will be transmitted to the light gates, which may impair their function and accuracy of measurement. Also, the length and weight of the apparatus may not exceed a certain, relatively low minimum amount, because otherwise the weapon becomes overly difficult to handle. Frequently the alterations that must be made to the barrel of the weapon in order to mount the apparatus are also undesirable, and in fact a certain change in firing conditions caused by mounting such an apparatus on the barrel of the weapon cannot be avoided.

Still other known measuring apparatuses therefore dispense entirely with the use of light gates, and instead use electrically conductive foil strips disposed spaced apart from one another, which are penetrated in succession by the projectile in flight. These apparatuses are, however, limited in their measuring accuracy and are relatively susceptible to disturbance factors.

THE INVENTION

It is accordingly the object of the invention to devise an apparatus for measuring the speed of projectiles in which the barrel of the weapon is not firmly connected to the apparatus and in which the danger of damage to the apparatus or of harm to persons caused by the projectile itself or by parts broken off by the projectile is reduced to a minimum.

Briefly, the two light responsive elements are disposed behind a separating wall which includes the light-admitting apertures and acts as a screen. The separating wall is aligned substantially parallel to the projectile path, and it extends from the vicinity of the muzzle of the gun to beyond the second light responsive element, that is, the one disposed farthest from the muzzle, so that it protects the light responsive elements from the projectile.

Because the two light responsive elements are disposed behind the smooth separating wall extending parallel to the projectile path, they and the apparatus are protected from damage caused by the projectile even in the event that the projectile should strike the separating wall as a result of misaiming or misfiring of the gun. The angle of impact of the projectile in that event is quite flat. The separating wall forms a glancing surface so that the projectile is simply deflected by the smooth separating wall, precluding the ricocheting of the projectile or the breaking off of parts of the apparatus by the projectile on impact.

Because of the separating wall, the distance between the two light-admitting apertures associated with the light responsive elements, which enters into the calculation of the projectile speed, is defined exactly, so that the projectile speed can be calculated with great accuracy. Finally, it is unnecessary for the measuring apparatus to be firmly connected to the barrel of the weapon.

In a preferred embodiment, the separating wall forms a part of the housing including the light responsive elements, and the arrangement may be selected such that the oblong housing is shaped like a prism in the direction of projectile flight, at least on the side oriented toward the projectile path.

In order to attain perfect measurement results even in the event of slight lateral deviations in the projectile path, it is suitable for the light admitting apertures to be embodied as oblong, narrow aperture slits oriented crosswise to the projectile path. Then each light responsive element may have an oblong light-sensitive surface disposed in accordance with the orientation of the apertures. To enable the use of light responsive elements having a small light-sensitive surface, at least one light collection lens, which is advantageously a cylinder lens having its axis oriented in the projectile path direction, may be disposed in the light path between each aperture and the light-sensitive surface of the associated light responsive element.

If the apparatus is used to measure the projectile speed of handguns in which a heavy deposit or residue of powder particles is to be expected, it is appropriate for each aperture to be covered by a transparent protective cover. This protective cover may be combined into a unit with the lens. Simultaneously, the cover prevents soiling of the light-sensitive surfaces of the light responsive element which would otherwise impair the sensitivity of the light responsive element.

In order to assure that the holder of the housing containing the light responsive elements will not present any dangerous surfaces that could be struck by the projectile, it is advantageous for the housing to be held in a stationary manner on the side opposite the projectile path; alternatively, in another form of embodiment, it may be held laterally with respect to the projectile path. In both cases, however, it is suitable for the housing holder to be disposed near the muzzle of the gun.

The apertures of the two light responsive elements are briefly partially darkened by the projectile passing over them, and this is utilized for triggering the signals emitted by the light responsive elements. Under favorable conditions, the apertures may be illuminated by daylight. However, if there is insufficient daylight where the gun is being tested, then some illumination devices must be used; and in that case, they too must be embodied such that they are not destroyed by the projectile, nor can they contribute to endangering persons because of a ricocheting projectile or parts broken off from them. In order to assure this, a housing containing at least one light source may be disposed on the side opposite the separating wall; this housing has two light radiating surfaces, possibly embodied by light outlet apertures, associated with the light entry apertures of the separating wall and disposed in a screen wall that extends along the separating wall and is spaced apart therefrom. With this provision, not only is any danger of injury from parts, such as shards of glass from a lamp, broken off by the projectile precluded, but also virtually constant, uniform light conditions are assured at the light entry apertures of the separating wall of the housing containing the light responsive elements. The screen wall of the housing containing the light source or sources also acts as a "separating wall" and protects the light source or sources from the projectile.

It is advantageous if oblong light radiating surfaces are used, which are oriented crosswise to the path of the projectile and thus extend parallel to the longitudinal extension of the light entry apertures of the separating wall of the housing containing the light responsive elements.

The light source may selectively be a point as well, in which case a condenser lens can be disposed in the light path between the light source and the light outlet opening; this lens directs the light emerging from the light source so that it is approximately parallel. For the reasons already mentioned, each light outlet aperture may be covered by a transparent protective covering, which again may be combined with the lens.

In order to guard against an accidental striking of the light entry or outlet opening, or its covering, or the vicinity thereof by the projectile, a projectile deflector of substantially wedge-shaped cross section and having a tip pointing toward the muzzle of the weapon may be disposed on the separating wall and/or on the screen wall, before the particular light entry or outlet opening as seen in the direction of projectile flight.

A compact, simple overall structure of the apparatus is attained if the two housings are interconnected by at least one connecting element extending to the side of the projectile flight path. This connecting element is advantageously disposed near the muzzle of the gun so that it cannot be struck by the projectile. By way of example, the connecting element may be in the form of a bracket and arranged for being secured to a stand or tripod, or in an alternative embodiment the connecting element itself forms a housing-like part of a stand or tripod, in which the signal evaluation circuit and the display device may be accommodated as well.

The connecting element may also be extended in the direction of projectile flight in order to provide the necessary rigidity of the connection. As a result of this prismatic extension, the connecting element presents a flat, smooth surface to the projectile flight path, which at most the projectile can strike only at such an acute angle that it will not ricochet but only be somewhat deflected. A particularly uncomplicated arrangement is attained if the connecting element is simultaneously embodied as the base plate for the housings, secured to it, of the light responsive elements and the light source or sources.

To attain the greatest possible accuracy in measurement, the projectile flight path should extend as precisely parallel as possible to the separating wall, containing the light-admitting apertures, of the housing receiving the light responsive elements, and to attain highly accurate replicability, the projectile flight path should always be located on the same line. To facilitate adherence to these conditions during firing, the apparatus may have at least one resting surface or support for the barrel of the gun, which is optionally embodied as elastically resilient if a predetermined load on it is exceeded. This support may be shaped such that the end of the barrel resting on it is held at a correct height and a correct lateral position, and the support is preferably embodied such that in response to a certain pressure it yields downward. If the end of the barrel imposes a sudden load not only upward but alway downward onto the support, then a sharp impact on the end of the barrel or on the fastening of the support is either avoided or resiliently absorbed by the resilient bearing of the support. In virtually recoil free weapons, such as compressed air guns, such resilient absorption need not be provided.

Accurate alignment of the barrel of the gun may be further facilitated by providing that the apparatus have a device, disposed behind the second light responsive element as viewed in the direction of projectile flight, for receiving a target panel which includes at least one sighting or aiming marker. The target may be made of some conventional material, such as cardboard, and the arrangement may be such that the target panel, optionally stiffened by being folded, is secured directly to one of the housings by securing means located outside the range of fire. The target may also have a hole concentric with the desired projectile flight path, permitting the passage therethrough of the projectile. The aiming marker of the target is at a variable height, corresponding to the distance between the sight or aiming line and the projectile path. The target may therefore also have a measuring scale for different distances between the aiming line and the projectile path, and then the apparatus can be used as desired for various handguns and small arms without having to change the target panel.

Finally, the signal evaluation circuit and/or the display device may be disposed in one of the housings and/or in the connecting element between the two housings. It is advantageous in this respect if the signal evaluation circuit has a pulse counter that is triggerable by the signal arriving from the first light responsive element; until it receives the signal from the second light responsive element, the pulse counter counts clock pulses supplied by a clock pulse source at a predetermined, fixed clock frequency. The signal evaluation circuit contains a computer circuit which from the counter state and the distance between the light responsive elements calculates the projectile speed, so that the user of the apparatus need not perform any calculations himself, and the display device displays the projectile speed directly.

In order to preclude disturbances which do not precede the projectile, as a flame front does, for example, but instead occur only after it has traveled past the light entry aperture, particularly of the first light responsive element, the signal evaluation circuit may have a lockout circuit which during a predetermined period of time after the response of the second light responsive element prevents the evaluation of signals arriving from the light responsive elements.

Finally, it is also advantageous if the apparatus has a device for varying the sensitivity of the light responsive elements and/or for affecting the intensity of the signals emitted by the light responsive elements. In this manner, the apparatus can be adjusted in accordance with the different firing conditions or characteristics existing when a given weapon is being tested so that the apparatus is capable of distinguishing perfectly between the projectile and any disturbances such as a flame front, gunsmoke and attendant substances. This adjustment may be accomplished either in an infinitely variable manner or in incremental gradations.

DETAILED DESCRIPTION

Figure 1:
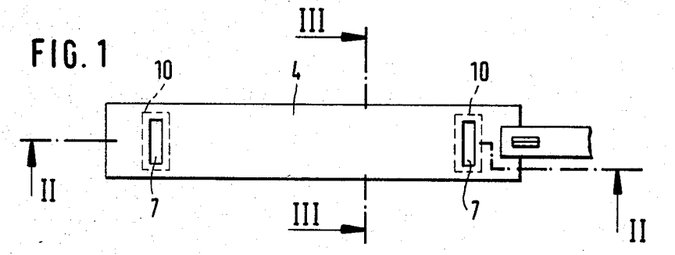
FIG. 1 shows an apparatus according to the invention in a plan view on a first form of embodiment.
Figure 2:
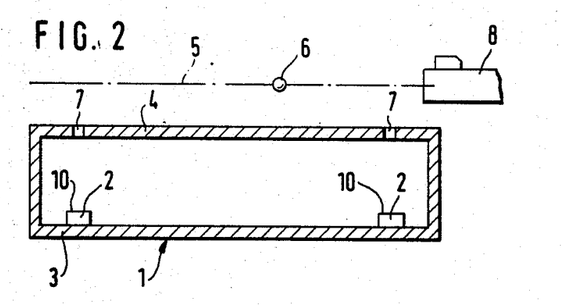
FIG. 2 shows the apparatus according to FIG. 1 in a sectional side view, in schematic form, taken along the line II—II of FIG. 1.
Figure 3:
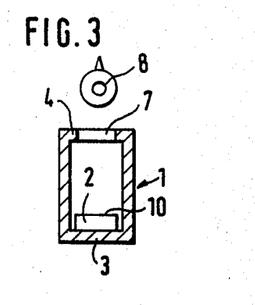
FIG. 3 shows the apparatus according to FIG. 1 in a sectional side view, in schematic form, taken along the line III—III of FIG. 1.

The measuring apparatus shown in FIGS. 1–3 has an oblong, prismatic housing, defined by parallel faces and having a rectangular cross section, the height of which is somewhat greater than its width. Two light responsive elements 2 are accommodated in the housing, disposed in spaced positions on the bottom wall 3, on the line of longitudinal symmetry thereof. The light responsive elements 2 may be embodied by photo diodes, photo transistors, solar cells and the like, by way of example.

The flat covering wall of the housing 1 located parallel to and opposite the bottom wall is embodied as a separating wall 4 for the flight path 5 of the projectile 6. It includes two light entry apertures 7, which are associated with the two light responsive elements 2 and are disposed immediately above the light-sensitive surfaces thereof. As shown in FIG. 1, these apertures 7 are embodied as narrow light-admitting slits extending crosswise to the projectile path 5; they are aligned with their axis extending at right angles to the projectile path 5.

The housing 1 comprises a suitable, dimensionally stable material such as sheet metal or plastic, and the separating wall 4 has a thickness and property such that if a projectile 6 should strike it, the projectile is deflected at an acute angle, without being able to damage the separating wall or break off parts from it.

The projectile 6 fired from the barrel, shown at 8, of a handgun or other small arm moves along the projectile flight path 5, passing in succession over the two light entry slits 7, which are disposed spaced apart from one another by a precisely predetermined distance. As a result, the incident light on the light-sensitive surfaces of the light responsive elements 2 is briefly reduced in succession, resulting in the emission of electrical signals by the two light responsive elements 2. These signals are evaluated in a signal evaluation circuit shown in FIGS. 20, 21, which will be explained below. From the time interval between the signals of the two light responsive elements 2 and from the known distance between the two light entry slits 7, this signal evaluation circuit automatically calculates the projectile speed and causes it to be displayed in the display device.

The two light responsive elements 2 are disposed in the interior of the housing 1, spaced sufficiently far apart from the light entry slits 7, and are protected from being affected in any way by the projectile.

Figure 4:
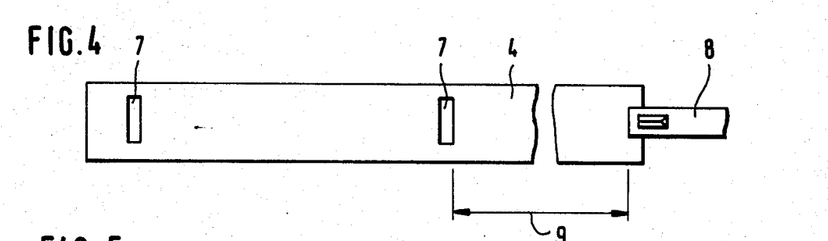
FIG. 4 shows the apparatus according to FIG. 1 in a modified embodiment, seen in plan view.

As shown in FIGS. 1-3, the separating wall 4 extends from the vicinity of the muzzle of the barrel 8 to beyond the light responsive element 2 located more remote from the muzzle, that is, the left-hand light responsive element. In testing weapons in which a pronounced muzzle flash with smoke, or the emission of attendant substances, must be expected upon firing, the form of embodiment of the apparatus shown in FIG. 4 is suitable.

In this apparatus, the separating wall 4 is extended, that is, made longer, as indicated by an arrow 9 in the region between the muzzle of the barrel 8 and the first (right-hand) light responsive element adjacent to it. Thus the muzzle flash, smoke and any attendant substances that may appear either will not reach the right-hand light entry slit 7, or at least will no longer reach it with an intensity such that the associated light responsive element 2 would erroneously recognize the flame front or the front edge of the cloud of smoke or accumulations of foreign bodies instead of the projectile 6.

The light responsive elements 2 advantageously have an oblong light-sensitive surface aligned in the longitudinal direction of the light entry slits 7 and disposed directly vertically below the respective light entry slit 7. These light-sensitive surfaces are shown at 10 in FIG. 1 by means of dashed lines.

Figure 5:
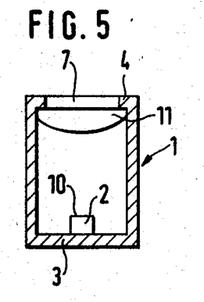
FIG. 5 shows the apparatus according to FIG. 1, with a modified embodiment of the light path in the housing containing the light responsive elements, seen in a cross-sectional illustration corresponding to FIG. 3.
Figure 6:
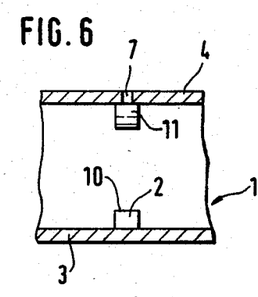
FIG. 6 shows the apparatus according to FIG. 5, in a fragmentary sectional view corresponding to FIG. 2.

If light responsive elements 2 having a relatively small light-sensitive surface 10 are to be used, then the form of embodiment shown in FIGS. 5, 6 can be used.

In this case, the arrangement is such that a cylinder lens 11 having an axis extending in the direction of the projectile path 5 is disposed in the housing 1 below each light entry slit 7. This lens collects the light entering through the light entry slit 7 and directs it onto the light-sensitive surface of the associated light responsive element 2. The light sensitive element 2 may thus be embodied in a shorter length, as shown in FIG. 6, in comparison with the form of embodiment shown in FIG. 3, because its light-sensitive surface 10 no longer needs to be extended over the length of the longitudinal dimension of the light entry slit 7 located above it.

The cylinder lens 11 additionally performs the function of covering the light entry slit 7, which is particularly important when testing small arms in which a heavy deposit of smoke particles or attendant particles must be expected. A further transparent covering may also be provided, located in the light entry slit 7 itself; this covering may be combined as needed with the cylinder lens 11 and assures that the surface of the separating wall 4 will be uninterruptedly smooth.

Figure 7:
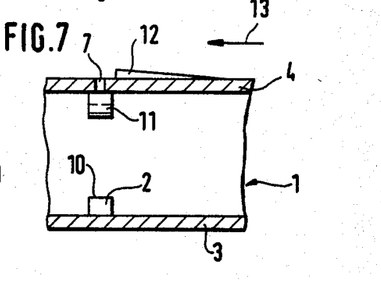
FIG. 7 shows the apparatus according to FIG. 6, having an additional projectile deflector, in a detail view corresponding to FIG. 6.

A projectile deflector 12 of wedge-shaped cross section may be disposed on the separating wall 4 in the manner shown in FIG. 7, before at least the light entry slit 7 that is most remote from the barrel 8, in the direction of projectile flight. The tip of this wedge points toward the barrel, and this deflector 12 prevents the projectile from striking the light entry slit 7 or the vicinity thereof. The direction of projectile flight is indicated by an arrow 13.

The housing 1 must be held in such a way that the holder itself likewise does not present any dangerous impact surfaces to the projectile; in other words, the holder must be located outside the field of fire.

Figures 8, 9:
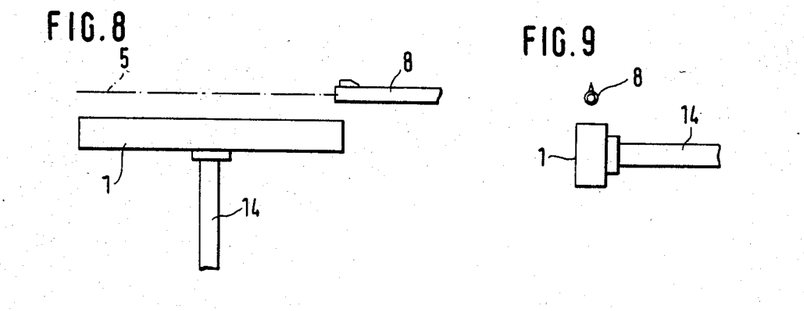
FIG. 8 shows the apparatus according to FIG. 1, in a schematic side view of the holder associated with it.
FIGS. 9 and 10 are an end-on side view and a plan view, respectively, of the apparatus according to FIG. 1 showing a different form of embodiment for the associated holder.

In the form of embodiment shown schematically in FIG. 8, the housing 1 is held stationary on the side opposite the flight path 5 by means of a stand or tripod 14.

Figures 10, 11:
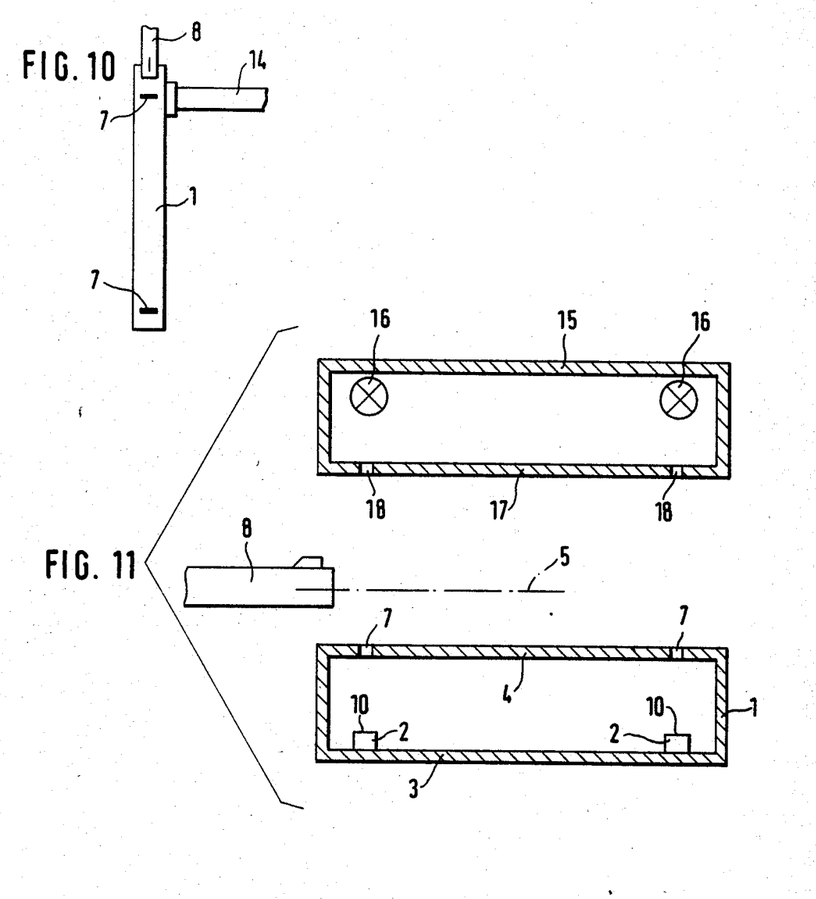
FIG. 11 is a schematic sectional side view, corresponding to FIG. 2, of a third form of embodiment of the apparatus according to FIG. 1 having an associated second housing containing the light sources.

In the form of embodiment shown in FIGS. 9 and 10, the holder is mounted laterally on the housing 1 in the form of an arm 14 or the like. As seen in FIG. 10, the arm 14 is located near the barrel 8, so that even in the event of severe errors in aiming, the arm 14 cannot be struck by the projectile.

If the apparatus is used under favorable conditions, the projectile path 5 and the light entry slits 7 of the housing 1 may be illuminated by daylight. If there is insufficient daylight for this purpose, however, then a separate illumination device must be used.

In the form of embodiment shown schematically in FIG. 11, a second housing 15, embodied identically and again being oblong and having a rectangular cross section, is disposed above the oblong housing 1 containing the light responsive elements 2. In this housing 15, two light sources 16 are accommodated, being embodied for instance as lamps. Opposite the light sources 16, two light outlet apertures 18 are disposed in a screen wall 17 aligned parallel with the separating wall 4 of the housing 1 and having substantially the same embodiment as the separating wall. The light outlet apertures 18 are located opposite the light entry apertures 7 of the housing 1. The light outlet apertures 18 are likewise embodied as narrow slits, which extend crosswise to the projectile path 5 and are aligned parallel to the light entry slits 7. The slit-like light outlet apertures 18 provide oblong light radiating surfaces in the screen wall 17. Alternatively, lights sources 15 having an oblong light radiating surface may be used, the light radiating surface then being disposed directly in the screen wall 17.

Similarly to what is shown in FIG. 7, projectile deflectors 12 of wedge-shaped cross section may be disposed on the screen wall 17 in front of the light outlet apertures 18, and in particular before the left-hand light outlet aperture 18 as seen in FIG. 11, so as to preclude the striking of a light outlet aperture 18 by the projectile.

The light sources 16 may also be virtually pointlike, and in that case it may be appropriate to dispose a condenser lens in front of each light outlet opening 18 in the housing 15, correspondingly to FIG. 5. The condenser lens aligns the light coming from the virtually punctiform light source 16 so that it is parallel. The condenser lens may at the same time serve as a covering for the light outlet aperture 18 with which it is associated; however, it is also possible to insert its own transparent covering into each light outlet aperture 18, in the manner already explained for the light entry apertures 7.

In accordance with FIGS. 8-10, the second housing 15 may also be held stationary on its side remote from the projectile path 5, that is, above or to the side of it, for instance by means of an arm 14, although this is not shown in detail in FIG. 11.

Figure 12:
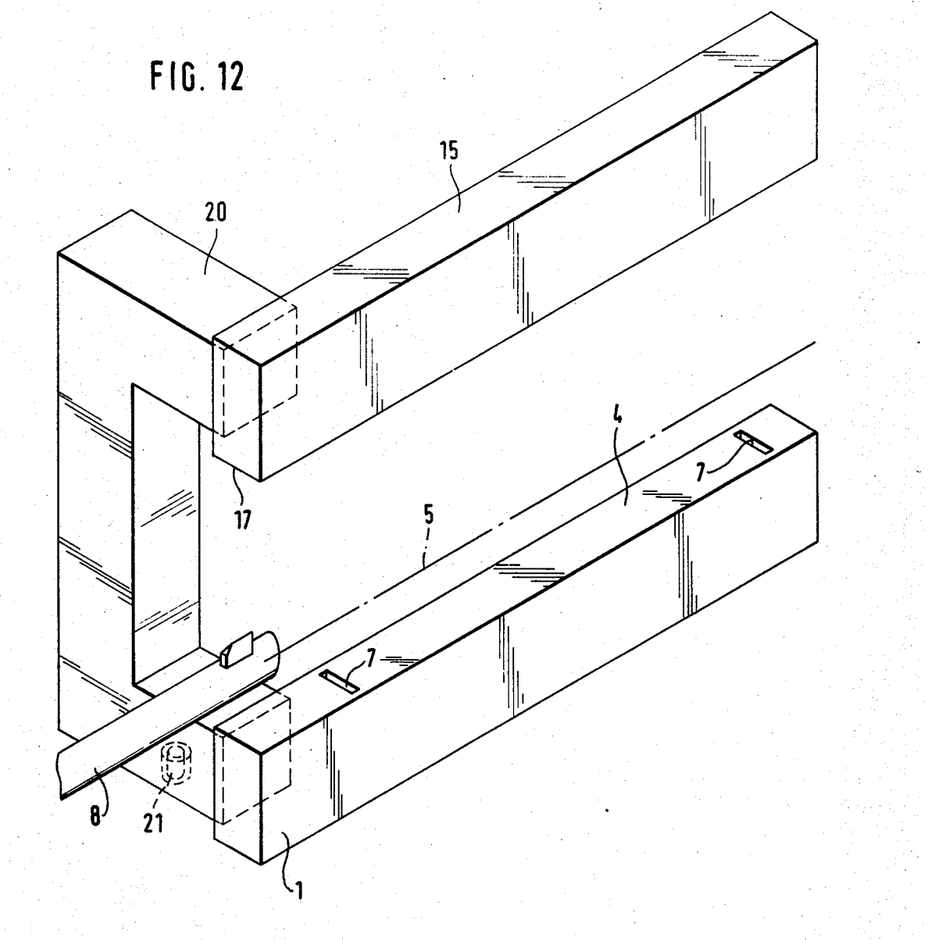
FIG. 12 is a perspective view of the apparatus according to FIG. 11, showing the connecting element that interconnects the two housings.
Figure 13:
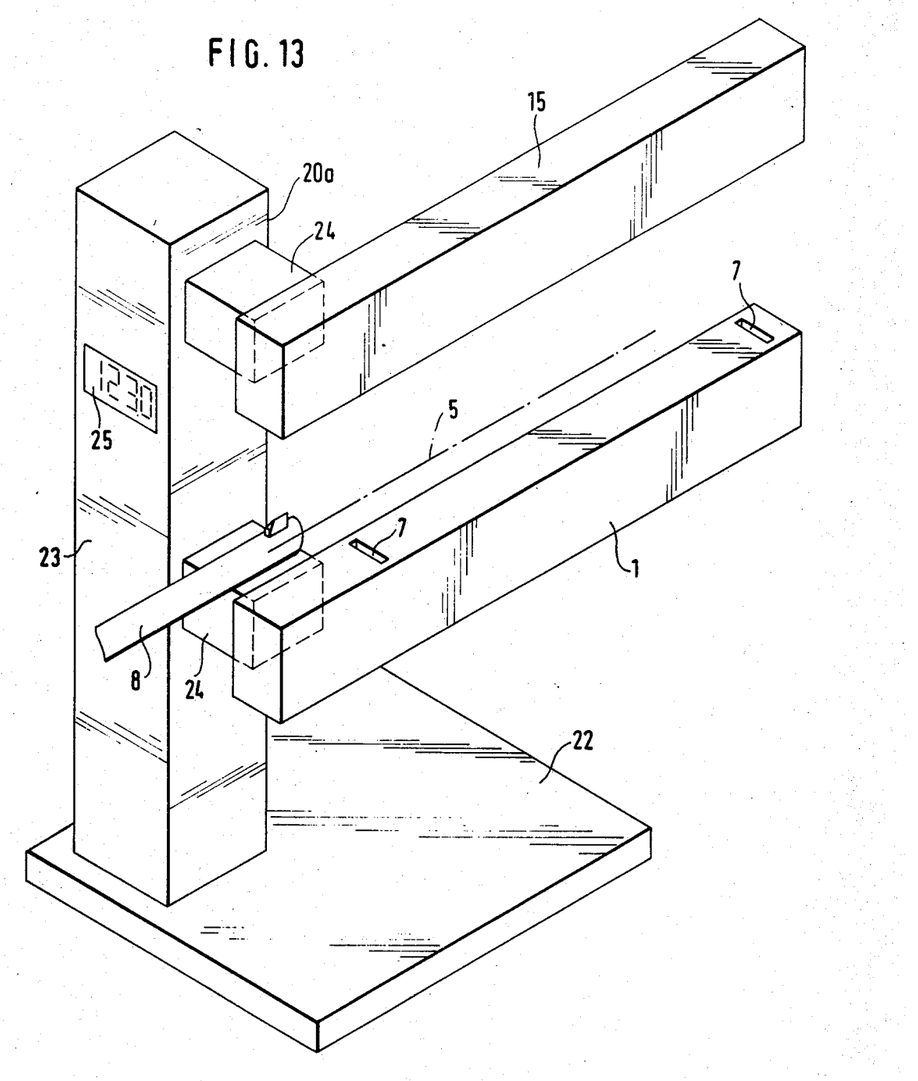
FIG. 13 is a perspective view of the apparatus according to FIG. 11, showing a modified form of embodiment of the connecting element interconnecting the two housings.
Figure 14:
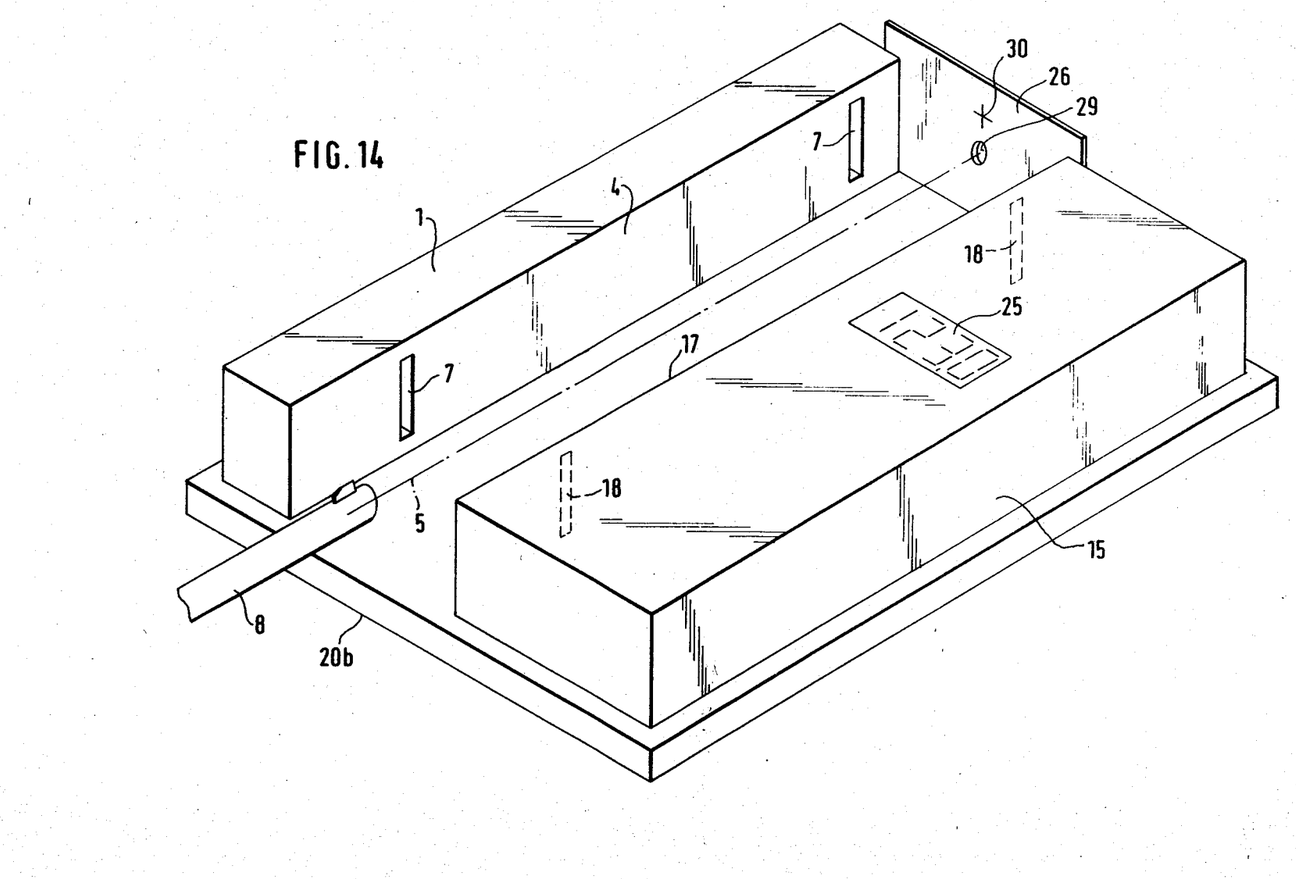
FIG. 14 is a perspective view of the apparatus according to FIG. 11, in a further modified form of embodiment of the connecting element between the two housings.

Examples of such practical forms of embodiment of the holder for the two housings 1, 15 are shown in FIGS. 12-14.

In the form of embodiment shown in FIG. 12, the two housings 1, 15 are interconnected by means of a laterally mounted connecting element 20 disposed in the vicinity of the muzzle of the barrel 8 and embodied substantially in the form of a U-shaped bracket. The connecting element 20 may be arranged such that it can be secured to a stand or tripod, not otherwise shown, and to this end it may have a threaded bore 21 on its underside. Optionally, the signal evaluation circuit and-/or the display device may also be accommodated in the hollow, housing-like connecting element 20.

In the form of embodiment according to FIG. 13, the connecting element 20a is itself embodied as a stand, having a flat base 22. Here again, the connecting element 20a is disposed in the vicinity of the muzzle of the barrel 8; the column 23 of the stand is connected with the housings 1, 15 via two horizontal attachment elements 24 standing out from the sides of the housings 1, 15. The display device and/or the signal evaluation circuit are accommodated in the housing-like column 23, and the display device itself is shown at 25.

In a further form of embodiment, which is shown in FIG. 14, the connecting element 20b is embodied in the form of a base plate onto which the two housings 1, 15 are mounted such that they extend parallel to one another. The connecting element 20b which forms the base plate thus has a length, viewed in the direction of projectile flight, which corresonds at least to the distance between the two light entry apertures 7, and in the area between the separating wall 4 and the screen wall 17 it forms a smooth surface in a straight line, which does not present any impact faces for the projectile fired from the barrel 8.

The signal evaluation circuit and/or the display device 25 in this form of embodiment are accommodated in the housing 15; however, it would also be possible to accommodate them similarly in the housing 1.

Finally, it would also be possible to use the holder in such a way that it is rotated by 90° with respect to FIG. 14, or in other words with the base plate 20b aligned vertically.

In order to attain the maximum possible accuracy of measurement, the projectile path should be located parallel to the separating wall 4 and as much as possible always on the same line. To facilitate the aligning of the barrel 8 that is then required, a target panel 26 is disposed on the side facing the end of the barrel 8; it comprises a suitable material, such as cardboard, and its fastening means are located outside the field of fire.

Figure 15:
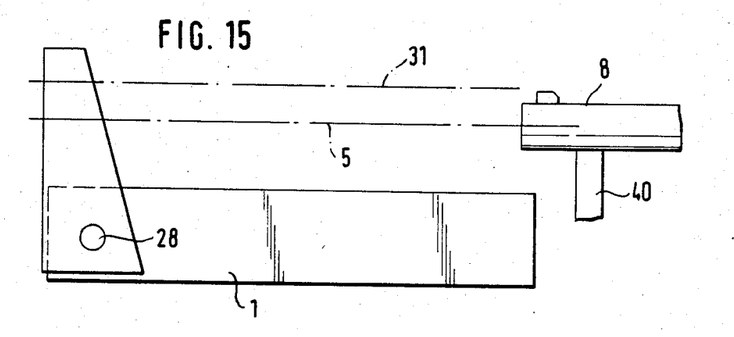
FIG. 15 is a schematic side view of the apparatus according to FIG. 1, having a target panel mounted at the end.
Figure 16:
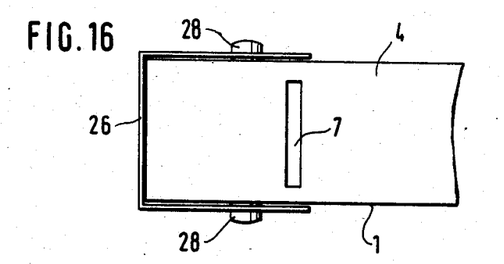
FIG. 16 is a plan view of a detail of the apparatus according to FIG. 15.
Figure 17:
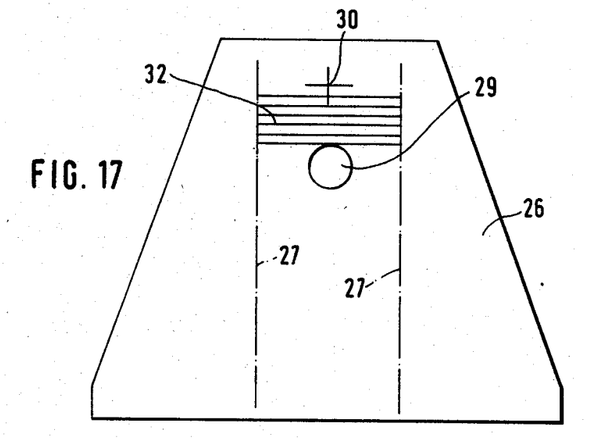
FIG. 17 shows the target panel of the apparatus according to FIG. 15 in the unfolded state, in a plan view and on a different scale.

While in FIG. 14 the target panel 26 is fastened to the rearward end of the two housings 1, 15 by means of two clamps not shown in detail, the arrangement in the form of embodiment shown in FIGS. 15, 16 is such that the substantially trapezoidal target panel 26 shown in FIG. 17 has two parallel fold lines 27, the distance between them corresponding to the width of the housing. As can be inferred from FIGS. 15, 16, the target panel 27 is folded into approximately a U shape by folding along the fold lines 27 and is mounted upon the housing 1 at the end; the fastening means, which for example comprise magnetic buttons, are indicated at 28. Concentrically with the projectile path 5, a hole 29 is stamped out of the target panel 26 so as to permit the passage therethrough of the projectile; thus if the weapon is accurately adjusted, the panel will undergo little or no damage. Above the hole 29, an aiming mark 30 is disposed on the target 26, corresponding to the aiming line shown at 31 in FIG. 15 and located concentrically with this aiming line 31. Depending upon the distance between the aiming line 31 and the projectile path 4, the aiming mark 30 is at a variable height. It may be embodied as a cross, as in FIG. 17, or as a ring, and so forth. For testing different weapons, a measuring scale 32 (FIG. 17) may be used, instead of a single aiming mark 30, so as to take into account the different distances between the bore of the barrel and the aiming line 31.

The alignment of the weapon can be still further facilitated by providing that the apparatus have at least one support or resting surface for the end of the barrel 8; this is shown schematically in FIGS. 8 and 15 at 400 and 40, respectively. The support 40 or 400, which has a prism-shaped resting surface, is nonresilient when intended for use with practically recoil free weapons, such as compressed air guns. In simple cases, it can be secured to the housing 1, as shown in FIG. 15. For lightweight recoil free weapons, two supports 40, 400 may be disposed spaced apart from one another on an extension rail 410 secured to the housing 1, as shown by dashed lines in FIG. 8, so that the weapon placed upon them is automatically lined up properly, and target panels or the like are unnecessary. It is also possible for the support to be disposed separately from the housing.

In other weapons which do recoil, a resilient arrangement is desirable. Its practical construction is shown in two forms of embodiment in FIGS. 18, 19.

Figure 18:
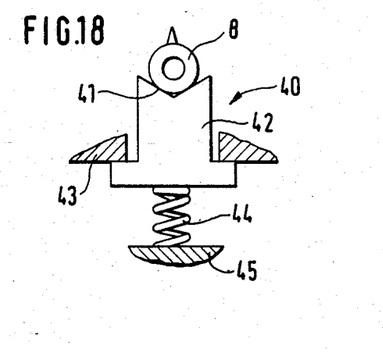
FIG. 18 is a schematic front view of a support for the barrel of a weapon intended for the apparatus according to FIG. 1.

In the form of embodiment shown in FIG. 18, the support 40 has a support member 42 provided with a prismshaped receptacle 41, which is supported in a vertically displaceable manner in a stationary base plate 43—which may for example be embodied by the connecting element 20b of FIG. 14—and is supported at the bottom on a stationary abutment 45.

The support member 42 is thus supported in such a way that it yields downward in response to a certain pressure. If when a shot is fired the end of the barrel 8 not only moves upward but also strikes the support member 42 below it, this yielding or resilient bearing of the support member 42 prevents a hard impact upon the end of the barrel 8 or upon the holder (43, 45) of the support member 42.

Figure 19:
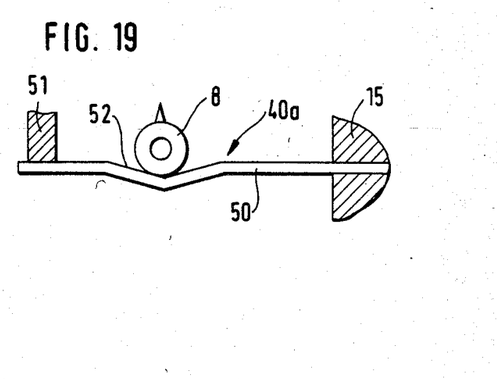
FIG. 19 is a schematic side view of a modified form of embodiment of the weapon barrel support for the apparatus according to FIG. 1.

In the form of embodiment shown in FIG. 19, this resilient or buffered bearing of the barrel 8 is attained by providing that a horizontally extending, outwardly protruding spring 50 is fastened at one end into a stationary holder disposed laterally with respect to the barrel 8 and embodied by way of example by the housing 15 or 1 in the form of embodiment shown in FIG. 14. On its free end, the spring 50 is supported against a stationary abutment above it—embodied for instance by the housing 1, in the form of embodiment shown in FIG. 14—in a resilient manner. If the end of the barrel 8 strikes the spring 50 when a shot is fired, then the spring is capable of deflecting downward. If contrarily the initial stress of the spring 50 is not exceeded when the barrel 8 is placed upon it, so that the spring 50 remains with its free end in contact with the abutment 51, then the height and lateral position of the barrel 8 are unequivocally fixed. To this end, the spring has a prismatically shaped surface at 52.

Figure 20:
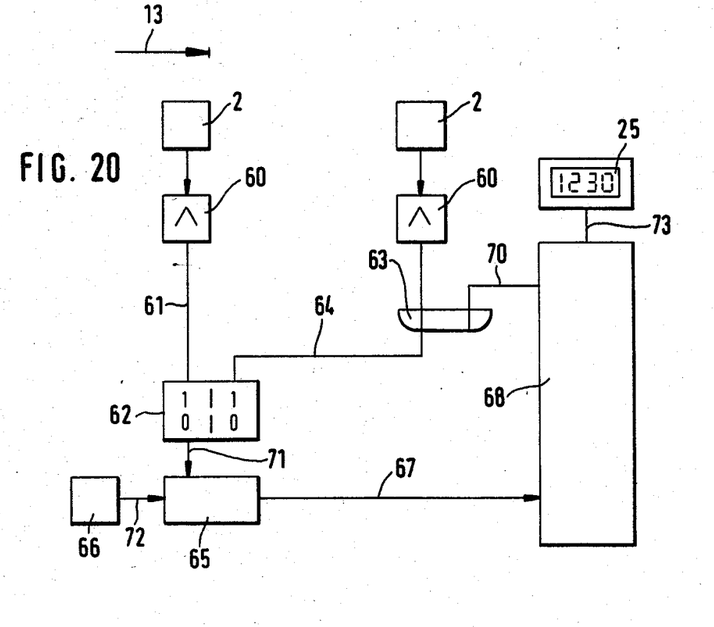
FIG. 20 is a block circuit diagram for the signal evaluation circuit and the display device of the apparatus according to FIG. 1.
Figure 21:
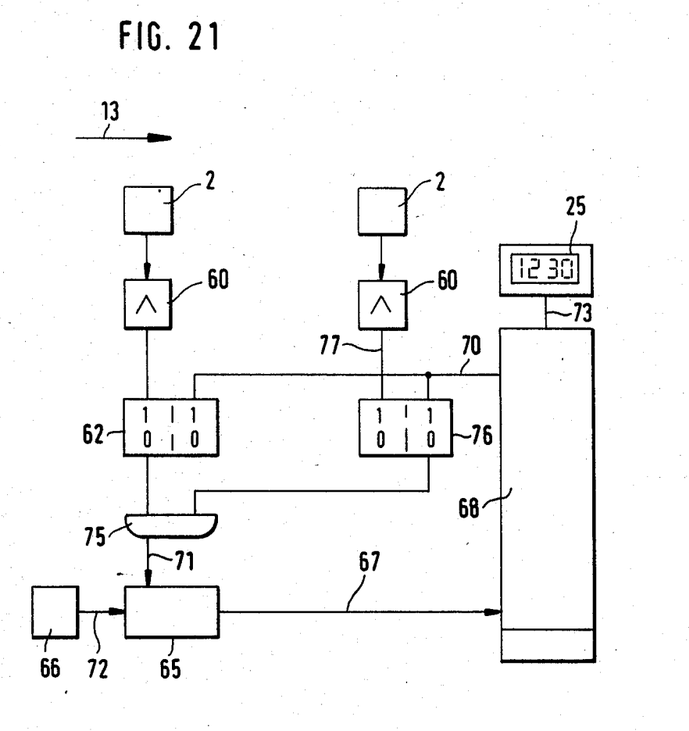
FIG. 21 is a block circuit diagram for a modified form of embodiment of the signal evaluation circuit and the display device of the apparatus according to FIG. 1.

Finally, FIGS. 20 and 21 show two forms of embodiment of the signal evaluation circuits associated with the light responsive elements 2.

In both circuits, the two light responsive elements 2 have amplifiers 60 connected to their output side, by means of which the signals emitted by the light responsive elements 2 are amplified; these signals appear whenever the projectile passes over the particular light entry slit 7 associated with a respective light responsive element 2, as has already been explained. The direction of projectile travel is indicated by the arrow 13.

The amplified signal arriving from the left-hand (first) light responsive element 2 is carried via a line 61 to a memory 62, while the right-hand (second) light responsive element 2 is connected with the memory 62 via its amplifier 60 and an OR element 63 as well as a line 64.

Connected to the memory 62 at its output side is a counter 65, which is capable of counting the clock pulses supplied to it at a predetermined, fixed clock frequency by a clock generator 66 and which sends a signal, in accordance with the counting result attained, via a line 67 to a computer stage 68, which in turn triggers the display device 25.

When the apparatus is put into operation, a part of the circuit contained in the computer stage 68 sets the memory 62, via a line 70 and the OR element 63, such that the memory 62 blocks the counter 65 via a line 71. If a projectile is now detected by the first (left-hand) light responsive element 2, then the amplified signal supplied by this element via the line 61 sets the memory 62 such that via the line 71 it unblocks the counter 65, which now counts the pulses supplied to it by the clock transducer 66 via the line 72.

If the projectile is soon afterward detected by the second (right-hand) light responsive element 2, then its amplified signal, supplied via the OR element 63 and the line 64, sets the memory 62 such that it again blocks the counter 65 via the line 71.

Via the line 67, a signal corresponding to the change in the counter state of the counter 65 is delivered to the computer stage 68, which on the basis of this change in the counter state, the known clock frequency of the clock transducer 66 and the known distance between the two light entry slits 7 calculates the speed of the projectile and sends a corresponding signal via the line 73 to the display device 25, which causes the result of this calculation to be displayed.

To assure that the projectile is reliably distinguished from disturbances such as a flame front or a cloud or smoke and attendant substances, it is suitable to provide that the sensitivity of the amplifiers 60 or the light responsive elements 2 be infinitely variable, or be adjustable in incremental gradations.

In certain weapons, disturbances such as a flame front may appear not in advance of the projectile but following it. In order to guard against incorrect measurements in this case as well, the arrangement may be selected such that the computer stage 68 blocks the counter 65, via the OR element 63 and the memory 62, for a predetermined period of time, in which it is possible for disturbances to occur, following the receipt of the signal arriving from the second (right-hand) light responsive element 2.

When the circuit functions in this way, the danger occasionally arises that the first (left-hand) light responsive element 2 will respond again, this time to a disturbance, so briefly after the second (right-hand) light responsive element has responded to the projectile that the counter 65 interrupts the counting only briefly, with the result that the computer stage 68 cannot perceive the interruption in counting—if indeed such an interruption even takes place in this instance. A remedy for this situation is afforded by the circuit according to FIG. 21, in which identical elements are identified by the same reference numerals as in FIG. 20 and need not be described again.

In FIG. 21, an AND element 75 is connected at the output side of the memory 62, and the second input of the AND element 75 is triggered by a second memory 76, which is connected on the one hand to the line 70 and on the other, via a line 77, to the amplifier 60 of the second (right-hand) light responsive element 2.

When the second (right-hand) light responsive element 2 detects the projectile, it sets the memory 76 such that via the AND element 75, the memory 76 blocks the unblocking of the counter 65 until such time as the computer stage 68 again resets both memories 62, 76 in such a manner that upon the next response of the first (lefthand) light responsive element 2 the counter 65 can be restarted.

For testing weapons in which a muzzle flash precedes the projectile, structural provisions may also be made on the apparatus itself, as will now be described.

As may be seen in FIG. 15, a stop 80 for the end of the barrel is disposed on the housing 1 beside the support 40, being located near the light entry slit 7 closer to the muzzle. The concept underlying the stop 80 is that the hot gases cannot overtake the projectile in the firing direction and be detected instead of the projectile by a light responsive element 2 until the projectile has left the barrel. This danger exists, however, over a distance which beginning at the end of the barrel is at most the length of the muzzle flash. If the muzzle is very close to the first light responsive element 2 (in FIG. 15, the one on the right) or in other words to its light entry slit 7, then this first light responsive element 2 will still detect the projectile itself, because the flame will not yet have overtaken the projectile.

If the second (in FIG. 15, the left) light responsive element 2, or in other words its light entry slit 7, is spaced apart from the first light responsive element 2 by a distance which is longer than the longest muzzle flash that can be expected, then the second light responsive element 2 can no longer be reached by the muzzle flash and detect it. In this manner, it is possible to avoid the distance between the end of the barrel and the first light responsive element 2 indicated at 9 in FIG. 4 and explained in connection with FIG. 4 above.

The stop 80, which is disposed at the light entry slit 7 of the first light responsive element 2, facilitates the holding of the weapon in such a manner that the end of the barrel of the weapon is located near this light entry slit 7, as shown in FIG. 15.

I claim:
1. Projectile speed measuring apparatus, particularly to determine muzzle velocity of a projectile fired from a handgun or other small arm in the direction of a measuring path (5) along which the projectile is adapted to pass, comprising two light gates located in spaced positions at a predetermined distance from each other along said measuring path (5);

a light responsive element (2) positioned at each one of the light gates;

a screen shielding the light gates and the light responsive elements from the projectile and being formed with an aperture (7) for each light gate;

and electronic response evaluation circuit coupled to the light responsive element providing an output signal representative of the speed of the projectile, and comprising, in accordance with the invention, a separating wall (4) located essentially parallel to said measuring path (5), the measuring path being located at one side thereof, said separating wall (4) forming said screen, being formed with said apertures (7) extending from a zone close to the muzzle of the gun and positioned beyond the light responsive elements farthest from the muzzle;

the light responsive elements (2) being located at the other side of the separating wall, to protect the light responsive elements against damage due to the projectiles (6) in the event of misaiming or misfiring of the gun, and to then provide a glancing surface for the projectile and to prevent ricochets.

2. Apparatus according to claim 1, wherein the separating wall (4) forms a part of the housing (1) containing the light responsive elements (2).

3. Apparatus according to claim 2, wherein the oblong housing (1) is prism-shaped in the projectile flight direction (13), at least on the side oriented toward the projectile path (5).

4. Apparatus according to claim 1, wherein the light entry apertures are embodied as oblong, narrow light entry slits (7) aligned crosswise to the projectile path (5).

5. Apparatus according to claim 4, wherein each light responsive element (2) has an oblong light-sensitive surface (10) disposed in accordance with the alignment of the light entry slits (7).

6. Apparatus according to claim 1, wherein at least one light collecting lens (11) is disposed in the light path between each light entry aperture (7) and the light-sensitive surface (10) of the associated light responsive element (2).

7. Apparatus according to claim 6, wherein the light collecting lens is a cylinder lens (11) having its axis aligned in the direction of projectile flight (13).

8. Apparatus according to claim 1, wherein each light entry aperture (7) is covered by a transparent protective covering.

9. Apparatus according to claim 2, wherein the housing (1) is held in a stationary manner on the side opposite the projectile path (5).

10. Apparatus according to claim 2, wherein the housing (1) is held to the side of the projectile path (5).

11. Apparatus according to claim 9, wherein the holder (14) of the housing (1) is disposed near the muzzle of the barrel.

12. Apparatus according to claim 1, wherein a housing (15) containing at least one light source (16) is disposed on the side opposite the separating wall (4), said housing (15) having two light radiating surfaces, which may as needed be embodied by light outlet apertures (18), oriented toward the light entry apertures (7) of the separating wall (4) and disposed in a screen wall (17) extending spaced apart from and along the separating wall (4).

13. Apparatus according to claim 12, wherein the light entry apertures are embodied as oblong, narrow light entry slits (7) aligned crosswise to the projectile path (5) and the apparatus has oblong light radiating surfaces, which are aligned crosswise to the projectile path (5).

14. Apparatus according to claim 13, wherein the light source (16) is virtually punctiform and a condenser lens is disposed in the light path between the light source (16) and the light outlet aperture (18).

15. Apparatus according to claim 14, wherein each light outlet aperture (18) is covered by a transparent protective covering.

16. Apparatus according to claim 1, further comprising a lens in the light path to the light responsive element.

17. Apparatus according to claim 12, wherein a projectile deflector (12) of substantially wedge-shaped cross section and having its tip pointing toward the barrel (8) of the gun is disposed on the separating wall (4) and/or on the screen wall (17) before the respectively associated light entry or outlet opening (7; 18) as viewed in the direction of projectile flight (13).

18. Apparatus according to claim 2, wherein the two housings (1, 15) are interconnected by means of at least one connecting element (20, 2a, 20b) extending to the side of the projectile path (5).

19. Apparatus according to claim 18, wherein the connecting element (20, 20a) is disposed close to the muzzle of the gun.

20. Apparatus according to claim 18, wherein the connecting element (20, 20b) is arranged for being secured to a stand.

21. Apparatus according to claim 18, wherein the connecting element (20a) embodies a housing-like part of a stand.

22. Apparatus according to claim 18, wherein the connecting element (20b) is extended, i.e. lengthened, in the projectile flight direction (13).

23. Apparatus according to claim 22, wherein the connecting element (20b) is embodied as a base plate for the housing (1, 15) secured upon it.

24. Apparatus according to claim 1, wherein there is at least one support (40) for the barrel (8) of the gun, the support having a selectively resilient portion.

25. Apparatus according to claim 1, wherein there is a device, disposed behind the second light responsive element (2), as viewed in the projectile flight direction (13), for receiving a target panel (26) containing at least one aiming marker (30).

26. Apparatus according to claim 25, wherein the target panel (26) has a hole (29) permitting the passage therethrough of the projectile (6).

27. Apparatus according to claim 2, wherein the signal evaluation circuit or electronic response evaluation circuit and/or the display device (25) is disposed in one of the housings (1, 15) and/or in the connecting element (20, 20a, 20b).

28. Apparatus, in particular according to claim 27, wherein the signal evaluation circuit has a pulse counter (65) triggerable by the signal arriving from the first light responsive element (2), said counter counting clock pulses delivered by a clock pulse source (66) at a predetermined clock frequency until the receipt of the signal from the second light responsive element (2), and that the signal evaluation circuit includes a computer stage (68) calculating the projectile speed from the counter status and the distance between the light responsive elements (2).

29. Apparatus according to claim 28, wherein the signal evaluation circuit has a lock-out circuit which for a predetermined period of time after the response of the second light responsive element (2) prevents the evaluation of signals arriving from the light responsive elements (2).

* * * * *